United States Patent
Sahoo et al.

(10) Patent No.: US 10,862,779 B2
(45) Date of Patent: Dec. 8, 2020

(54) APPLICATION DEPENDENCY DETERMINATION BASED ON APPLICATION LOGS

(71) Applicant: VMWARE, INC., Palo Alto, CA (US)

(72) Inventors: Sidhartha Sahoo, Bangalore (IN);
Vipul Chaudhary, Bangalore (IN);
Sandeep L. Hegde, Bangalore (IN);
Arunvijai Sridharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 87 days.

(21) Appl. No.: 15/959,314

(22) Filed: Apr. 23, 2018

(65) Prior Publication Data
US 2019/0327154 A1  Oct. 24, 2019

(51) Int. Cl.
| | |
|---|---|
| H04L 12/26 | (2006.01) |
| G06F 11/34 | (2006.01) |
| H04L 29/08 | (2006.01) |
| G06F 40/205 | (2020.01) |

(52) U.S. Cl.
CPC ........ *H04L 43/045* (2013.01); *G06F 11/3476* (2013.01); *G06F 40/205* (2020.01); *H04L 67/10* (2013.01)

(58) Field of Classification Search
CPC .................................................. H04L 43/045
See application file for complete search history.

(56) References Cited

U.S. PATENT DOCUMENTS

| | | | |
|---|---|---|---|
| 10,178,067 B1* | 1/2019 | Kumar | H04L 67/02 |
| 2005/0172306 A1* | 8/2005 | Agarwal | G06F 11/008 |
| | | | 719/328 |
| 2013/0159999 A1* | 6/2013 | Chiueh | G06F 9/45504 |
| | | | 718/1 |
| 2014/0289198 A1 | 9/2014 | Chikkalingaiah | |
| 2015/0081978 A1* | 3/2015 | Daly | G06F 12/0871 |
| | | | 711/133 |
| 2016/0366021 A1* | 12/2016 | Baron | H04L 41/065 |

* cited by examiner

*Primary Examiner* — Suraj M Joshi

(57) ABSTRACT

Techniques for determining dependencies between applications based on application logs are disclosed. In one embodiment, a system may include a log analyzer to receive application logs generated by a plurality of applications running in a computing environment and analyze the received application logs using a trained application inventory model to parse communication information of the plurality of applications. Further, the system may include an application management unit to determine dependency between a first application and a second application of the plurality of applications running on different compute nodes in the computing environment using the parsed communication information.

23 Claims, 8 Drawing Sheets

APPLICATION DEPENDENCY DETERMINATION BASED ON APPLICATION LOGS

RELATED APPLICATIONS

The present application is related in subject matter to U.S. patent application Ser. No. 15/959,321, which is incorporated herein by reference.

TECHNICAL FIELD

The present disclosure relates to computing environments, and more particularly to methods, techniques, and systems for determining dependencies between applications based on application logs in the computing environments.

BACKGROUND

In computing environments such as networked computing environments, cloud computing environments, virtualized environments, and the like, applications and processes may be comprised of multiple components operating on multiple devices. This is true particularly for enterprises that might be spread across multiple geographical locations. For example, a customer relationship management (CRM) system may utilize components such as a database, a web server, and a user application, each executing on a different compute node (e.g., a physical machine, a virtual machine, a container, and/or the like) in the computing environment. The compute nodes may be connected through a network. In such cases, it may be difficult to determine dependencies between applications running on different compute nodes in the large computing environments because of the scale and complexity involved in the infrastructure.

Figure 1:
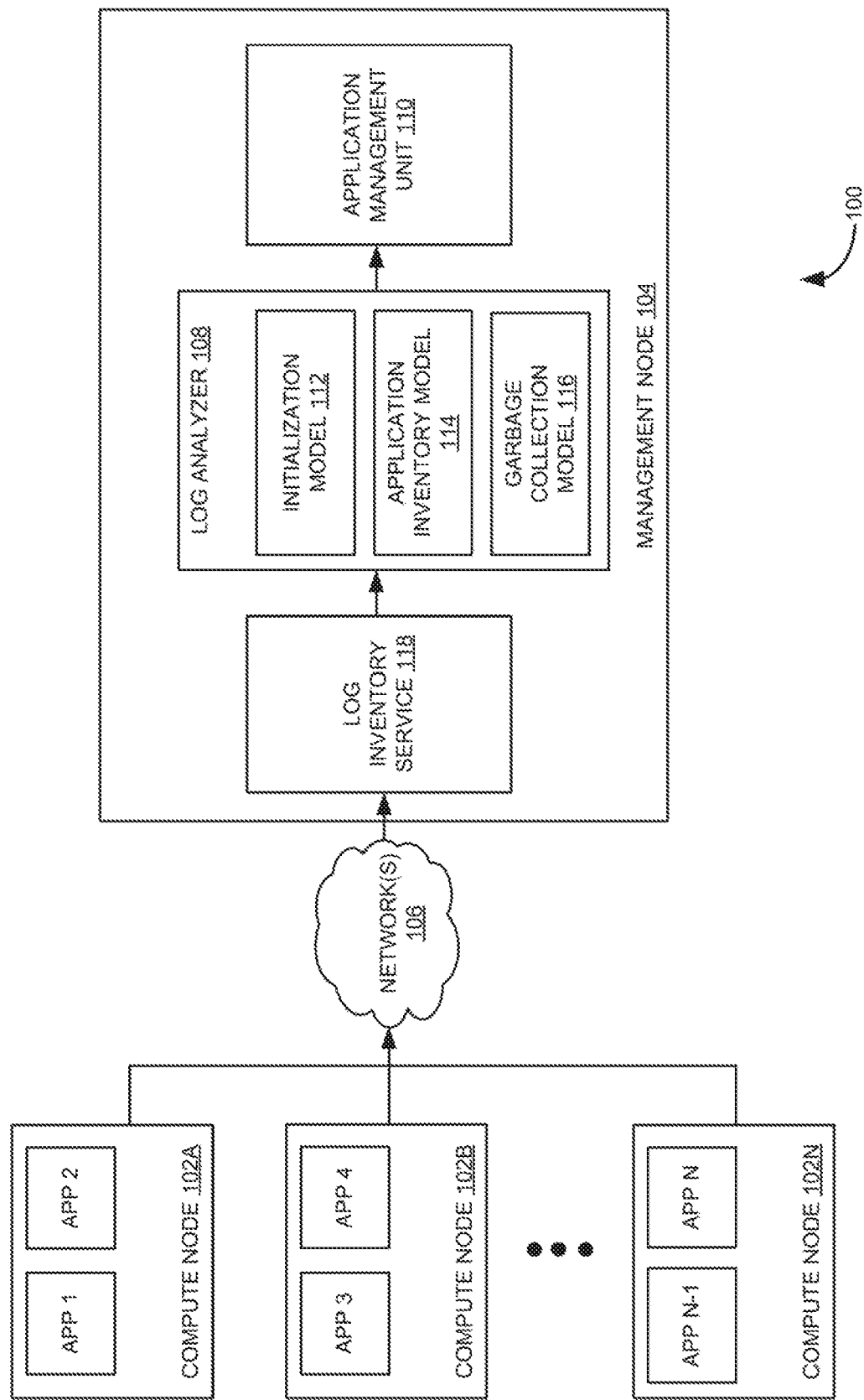
FIG. 1 is a system view of an example computing environment illustrating an application management unit to determine dependencies between applications through application logs.

The drawings described herein are for illustration purposes only and are not intended to limit the scope of the present subject matter in any way.

DETAILED DESCRIPTION

Embodiments described herein may provide an enhanced computer-based and network-based method, technique, and system for determining dependencies between applications through application logs. Determining application dependency may refer to a process of identifying communication between the applications running on different compute nodes or computing systems (e.g., an enterprise system) in the computing environment. The computing environment may be a networked computing environment such as an enterprise computing environment, a cloud computing environment, a virtualized environment, a cross-cloud computing environment, or the like.

With evolving network growth and matured computation virtualization techniques, enterprise applications have become more complex. For example, user applications are moved from a personal computer to virtual data center due to cloud computing. In this case, end users may use a remote application to request services provided by data center's service server. Therefore, the applications running on different computing systems depend on each other in the computing environment. Further, performance failure of a single computing system may affect whole computing environment's quality of service. In such computing environments, it may be important to understand how different applications may interact with or depend on each other. For example, the dependency information may provide insight into how application servers utilize databases, which application servers utilize which databases, which databases are shared among multiple application servers, and the like. With the dependency information, it may be possible to anticipate effects of change in one application towards other applications and thus the computing environment may be optimized for better performance or efficiency. However, determining dependencies between the applications in the computing environment may be difficult because of the scale and complexity involved in such infrastructures.

Some methods for determining dependency between the applications may include installing an agent on each physical server to monitor events reported by the applications and forward events to a central application management server. The application management server may, then, analyze the application events in a data center and determine the dependency between the applications running on the data center. Some other methods may install an agent on every physical server to sniff network traffic to/from the server and send the traffic logs to a central application server. The application server may analyze these traffic logs to discover the applications and/or generate application dependencies. However, the agents deployed on the physical servers may consume additional computing resources, generate overhead, provide less security (e.g., as the agents may need to run with administrative privileges to be able to discover processes and services from all users), include complex life cycle management, and/or may not capture services protected by rootkit.

In some other methods, the applications themselves may expose application programming interfaces (APIs). However, such methods may be less scalable, include capabilities limited to what can be achieved by running system scripts or application APIs, include complex life cycle management, and/or may not capture services protected by rootkit.

Examples described herein may eliminate the need for installing software program/agent on the compute nodes to determine dependencies between the applications. Examples described herein may determine dependencies between the applications using application logs/log files generated by the applications. The applications running on different compute nodes may have associated log files. Such log files may have information logged about the application instantiation or information about starting the application, application connection information, application synchronization information, monitoring topological or communication change information, and/or the like.

Examples described herein may receive the application logs generated by various types of applications running in the computing environment, analyze the received application logs using a trained application inventory model to parse communication information of the applications, and determine dependency between a first application and a second application of the applications running on different compute nodes in the computing environment using the parsed communication information. Examples described herein may employ machine learning and natural language processing techniques to train the application inventory model which can periodically scan the application logs for communication information of the applications. The term "application inventory model" may refer to a bot (e.g., a piece of software) that can execute commands to perform routine tasks either automatically or with minimal human intervention. The application inventory model may be trained to parse the communication information through associated application logs.

System Overview and Examples of Operation

FIG. 1 is a system view of an example computing environment 100 illustrating an application management unit 110 to determine dependencies between applications through application logs. As shown in FIG. 1, computing environment 100 may include multiple compute nodes 102A-N and a management node 104 that is in communication with compute nodes 102A-N over one or more networks 106. Each compute node (e.g., 102A-N) may refer to a computing device or computer program (i.e., executing on a computing device) that requests services from management node 104.

Example compute nodes 102A-N may include, but not limited to, physical computing devices, virtual machines, containers, or the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host operating system (OS) without the need for a hypervisor or separate OS. Management node 104 may refer to a computing device or computer program (i.e., executing on a computing device) that provides service to compute nodes 102A-N or applications (e.g., app 1 to app N) executing on compute nodes 102A-N. Compute nodes 102A-N and management node 104 may communicate over communication links (e.g., networks 106). Communication is according to a protocol, which may be a message-based protocol.

Example network 106 can be a managed Internet protocol (IP) network administered by a service provider. For example, network 106 may be implemented using wireless protocols and technologies, such as Wi-Fi, WiMAX, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to compute nodes 102A-N.

In some examples, compute nodes 102A-N may include processing resources/processors and memories, respectively. Example processor can be any custom made or commercially available processor, a central processing unit (CPU), an auxiliary processor among several processors associated with compute nodes 102A-N, a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by compute nodes 102A-N. Processors may be configured to execute software stored within associated one of memories, to communicate data to and from the memory, and to generally control operations of compute nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

Examples described in FIG. 1 may depict management node 104 in communication with multiple compute nodes 102A-N, however, in some examples, a group of management nodes or a cluster of management nodes can communicate with multiple compute nodes 102A-N over one or more networks 106 to provide services to compute nodes 102A-N.

Further, numerous types of applications may be supported on computing environment 100. For example, computing environment 100 may include a plurality of applications (i.e., app 1 to app N) running on corresponding compute nodes 102A-N. Example application may include a multi-tier application. The multi-tier application may be distributed across several compute nodes for execution. The applications (i.e., app 1 to app N) may generate application logs including information about the activities performed by the applications (i.e., app 1 to app N) to facilitate technical support and troubleshooting of the applications (i.e., app 1 to app N). The application logs may be sent to management node 104 for further analysis (e.g., to determine dependencies between the applications running on different compute nodes 102A-N).

Management node 104 may include a log analyzer 108 and application management unit 110. During operation, log analyzer 108 may receive application logs generated by the applications (app 1 to app N) running on compute nodes 102A-N in computing environment 100. In one example, the applications (app 1 to app N) may run in a single cloud or distributed across multiple clouds. In some examples, log analyzer 108 may receive the application logs from a log inventory service 118, for instance, residing in management node 104. In one example, log inventory service 118 may be used to index the application logs generated by the applications (i.e., app 1 to app N).

Log analyzer 108 may analyze the received application logs using a trained initialization model 112 to parse information about the applications (app 1 to app N), for instance, at periodic intervals of time. Further, application management unit 110 may determine a presence of one or more applications (e.g., app 3) based on the parsed information about the applications. In addition, application management unit 110 may determine the presence of individual components (e.g., processes, threads, and the like) of the application (e.g., app 3) using the parsed information upon determining the presence of the application (e.g., app 3). In one example, determining the presence of the application may include determining characteristics/configuration details of the application such as compute node, cluster details, communication port, network activity, resource universal unique identifier (UUID), resource identifiers, resource location, application name, application identifiers, resource name, custom properties, and/or the like. Further, application management unit 110 may store a state indicative of the presence of the application as "active" in an adjacency list. For example, the adjacency list may be referred as a collection of unordered lists used to represent a finite graph. Furthermore, application management unit 110 may generate a visualization to graphically represent an active application node corresponding to the application (e.g., app 3) based on the adjacency list and place the active application node as a dangling node. The dangling node may refer to an unconnected node in the visualization.

Further, log analyzer 108 may analyze the received application logs using a trained application inventory model 114 to parse communication information between the applications (app 1 to app N). Upon determining the presence of the applications (e.g., a first application and a second application), application management unit 110 may determine dependency between the first application and the second application running on different compute nodes in the computing environment using the parsed communication information. For example, dependency between the first application (e.g., app 3) running on a compute node (e.g., compute node 102B) and the second application (e.g., app 2) running on another compute node (e.g., compute node 102A) may be determined. Further, application management unit 110 may dynamically update the visualization (e.g., an application dependency map) to graphically represent dependency between a first application node corresponding to the first application (e.g., app 3) and a second application node corresponding to the second application (e.g., app 2) upon determining dependency between the first application (e.g., app 3) and the second application (e.g., app 2). In one example, the dependency may be represented by an edge between the first application node and the second application node in the application dependency map. For example, the visualization may be a graph with the applications represented by nodes and the dependency represented by edges between the nodes.

Further, application management unit 110 may determine disconnection between the first application (e.g., app 3) and the second application (e.g., app 2) based on analyzing the received application logs using trained application inventory model 114. Upon determining the disconnection, the edge between the first application node and the second application node may be deleted. Further, the first application node and the second application node can be placed as the dangling nodes when the first application node and the second application node are not connected to any other application nodes. Further, the visualization, i.e., the application dependency map, may be updated upon deleting the edge between the first application node and the second application node.

Furthermore, application management unit 110 may determine the inactive application by analyzing the received application logs using trained application inventory model 114. For example, trained application inventory model 114 may parse the application logs to check for disconnection events such as a "no response" and mark the application node corresponding to the application which does not respond as "inactive." Upon determining the inactive application, application management unit 110 may delete the application node corresponding to the inactive application using trained garbage collection model 116. Further, application management unit 110 may update the visualization upon deleting an application node corresponding to the inactive application using trained garbage collection model 116. Example trained application inventory model 114 and trained garbage collection model 116 are explained in FIG. 2. In one example, initialization model 112, application inventory model 114, and garbage collection model 116 may be trained on input words and/or strings of words using machine learning and natural language processing methods. For example, input words and/or the strings of words may be selected from historical application logs.

In some examples, the applications may be deployed, monitored and/or managed using the visualization or application dependency map. In one example, the applications may be monitored for health, connections, and/or resource usage. Example resource usage may be associated with at least one resource such as a processor, a memory, a network hardware, a bandwidth, or the like. In another example, the applications may be managed to perform a management function on the application based on monitoring. For example, an alert may be generated, a condition may be defined for triggering an alert, access rights may be managed, and/or the visualization may be used to troubleshoot the applications based on the dependencies between the applications.

In one example, log analyzer 108 and application management unit 110 may be implemented as engines or modules including any combination of hardware, firmware, programming, or a combination thereof to implement the functionalities described herein. Management node 104 can be a service process in the management application or can be an appliance running in the data center to cater multiple management applications in a cloud-based environment. For example, management application may be vSphere virtual center that is offered by VMware. Management application may be hosted or deployed in a physical server, VM, or container.

In some examples, the functionalities described herein, in relation to instructions to implement functions of log analyzer 108 and application management unit 110, and any additional instructions described herein in relation to the storage medium, may be implemented as engines or modules including any combination of hardware and programming to implement the functionalities of the modules or engines described herein. The functions of log analyzer 108 and application management unit 110 may also be implemented by a respective processor. In examples described herein, the processor may include, for example, one processor or multiple processors included in a single device or distributed across multiple devices.

Figure 2:
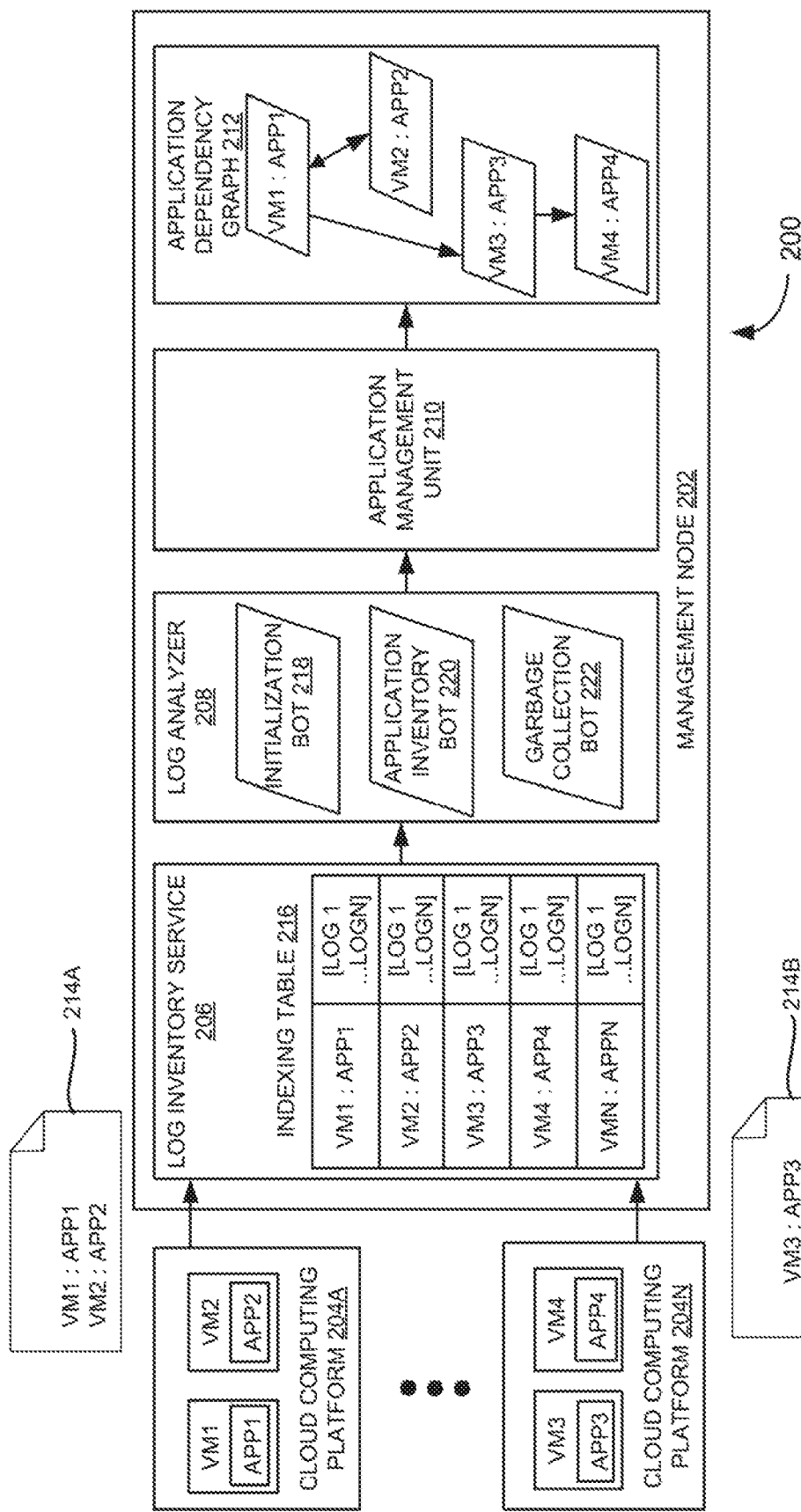
FIG. 2 is a block diagram of an example system for determining dependencies between applications through application logs in a multi-cloud environment.

FIG. 2 is a block diagram of an example system 200 for determining dependencies between applications through application logs in a multi-cloud environment. As shown in FIG. 2, system 200 may include a management node 202 and cloud computing environments (i.e., cloud computing platforms 204A-N) that are in communication with management node 202. Management node 202 may refer to a computing device or computer program (i.e., executing on the computing device), that provides some service to compute nodes (e.g., VM1-VM4) of cloud computing platforms 204A-N. Management node 202 may connect to cloud computing platforms 204A-N either directly or over a network (e.g., over a local-area network, wide-area network, wireless network, or the like).

As shown in FIG. 2, system 200 may support multiple cloud computing platforms 204A-N, available to multiple enterprises in single-tenant and multi-tenant configurations. In one example, cloud computing platforms 204A-N may be provided by different cloud service providers. For example, each cloud computing platform 204 may include, but not limited to, Amazon Web Services (AWS), Google Cloud Platform, Windows Azure, OpenStack, or any other cloud computing platform. In some examples, VMs may be created and run in the AWS such as Amazon Elastic Compute Cloud (EC2).

Each cloud computing platform 204 may be operated by a cloud computing service provider and exposed as a service available to tenants (e.g., account holders), such as enterprises. In some examples, cloud computing platform (e.g., 204A-N) may be configured to dynamically provide an enterprise or users with one or more virtual data centers in which a user may provision VMs, deploy multi-tier applications on VMs, and/or execute workloads. Cloud computing platform (e.g., 204A-N) may include an infrastructure platform upon which a cloud computing environment may be executed. The term "multi-tier application" may refer to an application in which different functions of the application are logically separated (e.g., using different VMs and/or VM clusters) to handle different tasks or functions of the application.

As shown in FIG. 2, VMs (i.e., VM1 to VM4) may be deployed within cloud computing platforms 204A-N to provide infrastructure services, IT management services, and other infrastructure-related functions to tenants. Further, VMs (VM1 to VM4) running on different cloud computing platforms 204A-N may be centrally managed by management node 202. Even though FIG. 2 depicts two VMs running in each cloud computing platform 204, in some examples, multiple VMs can be deployed in each cloud computing platform 204. In other examples, containers can also be deployed in each cloud computing platform 204. Further, the VMs and/or containers may execute applications running therein.

Examples described herein can also be implemented in a hybrid computing environment, which may include several clusters of individual physical machines with each physical machine supporting hundreds of virtual machines (VMs) or containers. In the hybrid computing environments, each application is an executable computer software running on either physical machines, containers, or virtual machines.

Examples described herein can also be implemented in cross cloud computing platforms, where different VMs or containers may run on various types/flavors/versions of OS.

The format and content of the application logs may be determined by a developer of the application. For example, an application log may refer to a file of events that are logged by an application (i.e., software application). The application log may include errors, informational events, warnings, and/or the like.

In one example, management node 202 may include a log inventory service 206, a log analyzer 208, and an application management unit 210. As shown in FIG. 2, application logs 214A and 214B including relevant communication information may be collected and indexed in log inventory service 206. Log inventory service 206 may provide subscribed end-points to index application logs 214A and 214B generated by applications (app 1 to app 4). Log inventory service 206 may maintain an indexing table 216, which includes a hash-based data structure where each entry associated with application logs 214A and 214B may maintain a resource key to identify a host application and a value as a list of log files. An example data structure of the resource key may include:

| Resource UUID | Resource identifiers | Resource location | Application name | Application identifiers | Resource name | Custom properties |
|---|---|---|---|---|---|---|

Further, log analyzer 208 may loop through the application logs from log inventory service 206 and parse the relevant information about the applications. In one example, log analyzer 208 may use a trained initialization bot (I-Bot) 218, a trained application inventory bot (A-bot) 220, and a trained garbage collection bot (G-bot) 222 to look for information such as application connection, application synchronization, monitoring topological or communication changes between the applications. For example, log analyzer 208 may use trained initialization bot 218, trained application inventory bot 220, and trained garbage collection bot 222 to obtain information corresponding to application initialization, instantiation, communication and connection/disconnection messages such as "listening on http://<fqdn>:<port>", "New Node added", "Starting service", "Stopping Service", and the like. The terms "initialization bot" and "initialization model" are used interchangeably throughout the document. The terms "application inventory bot" and "application inventory model" are used interchangeably throughout the document. Further, the terms "garbage collection bot" and "garbage collection model" are used interchangeably throughout the document.

Once initialization bot 218, application inventory bot 220 and garbage collection bot 222 are trained, initialization bot 218, application inventory bot 220 and garbage collection bot 222 can scan the real-time application logs to detect the presence, communication/connection, and/or absence of the applications respectively at periodic intervals of time. The training of initialization bot 218, application inventory bot 220 and garbage collection bot 222 may be continued through machine learning and natural language processing methods, which can improve accuracy to investigate and parse the relevant data over time. The parsed information may, then, be sent to application management unit 210 to generate an adjacency list. The adjacency list may be referred as a collection of unordered lists used to represent a finite graph. Further, based on the adjacency list, application management unit 210 may generate a visualization (e.g., an application dependency graph 212).

Log analyzer 208 and application management unit 210 may be implemented as engines or modules including any combination of hardware, firmware, programming, or a combination thereof to implement the functionalities described herein.

During operation, log analyzer 208 may utilize initialization bot 218 to identify/discover the application through associated application logs when the application is in the starting or initialization phase. An example flow chart for initialization bot 218 is explained in FIG. 3A.

Figure 3A:
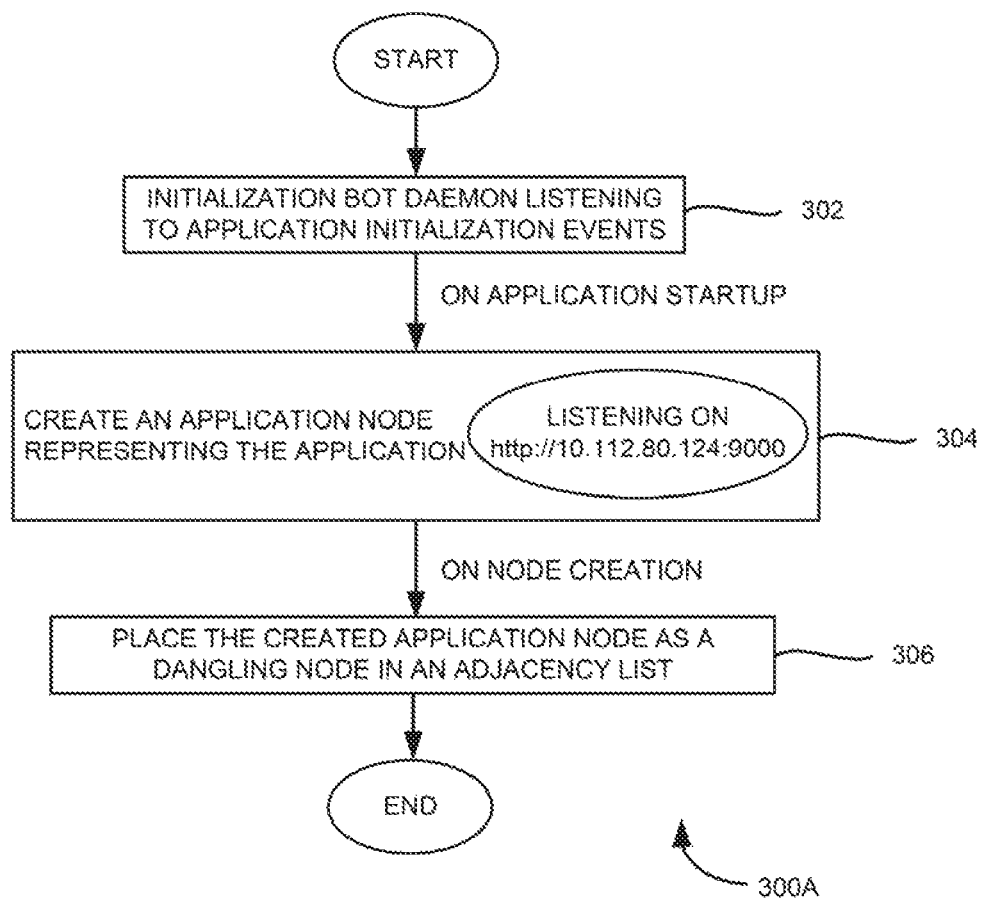
FIG. 3A is an example flow diagram illustrating determining/discovering an application through application logs during a start or initialization phase of the application.

Referring now to FIG. 3A, which is an example flow diagram 300A illustrating determining/discovering an application through application logs during a start or initialization phase of the application. As depicted in FIG. 3A, an application node (e.g., dangling node/an unconnected node) may be created for each application that is identified by the initialization bot as follows. At 302, the initialization bot (e.g., initialization bot 218 of FIG. 2) may listen to application initialization events. Upon starting an application, the application node representing the application may be created, at 304. At 306, the created application node (e.g., app 1: node 1, app 2: node 2, or the like) may be placed as the dangling node in an adjacency list, which can be represented in a graph (e.g., an application dependency graph 212 of FIG. 2).

For example, when a tomcat server starts, initialization bot 218 may be used to identify the fully qualified domain name/Internet protocol (FQDN/IP) and port where the tomcat server is running. In this example, initialization bot 218 may analyze tomcat logs to identify an application. In some examples, initialization bot 218 may be trained to create the application from associated application logs which may have pattern such as IP/Hostname/FQDN, port, the application name, and the like.

Referring back to FIG. 2, an example algorithm for initialization bot 218 to create the application node is shown below:

```
Parse for initialization log messages;
For all initialization event of each application host H do
{
    if not NODE-EXISTS (H) then
    {
        CREATE-NODE (H);
        MARK-NODE-ACTIVE (H);
    }
}
```

Further, log analyzer 208 may utilize application inventory bot 220 to identify connections/communication between the applications through associated application logs. An example flow chart for application inventory bot 220 is explained in FIG. 3B.

Figure 3B:
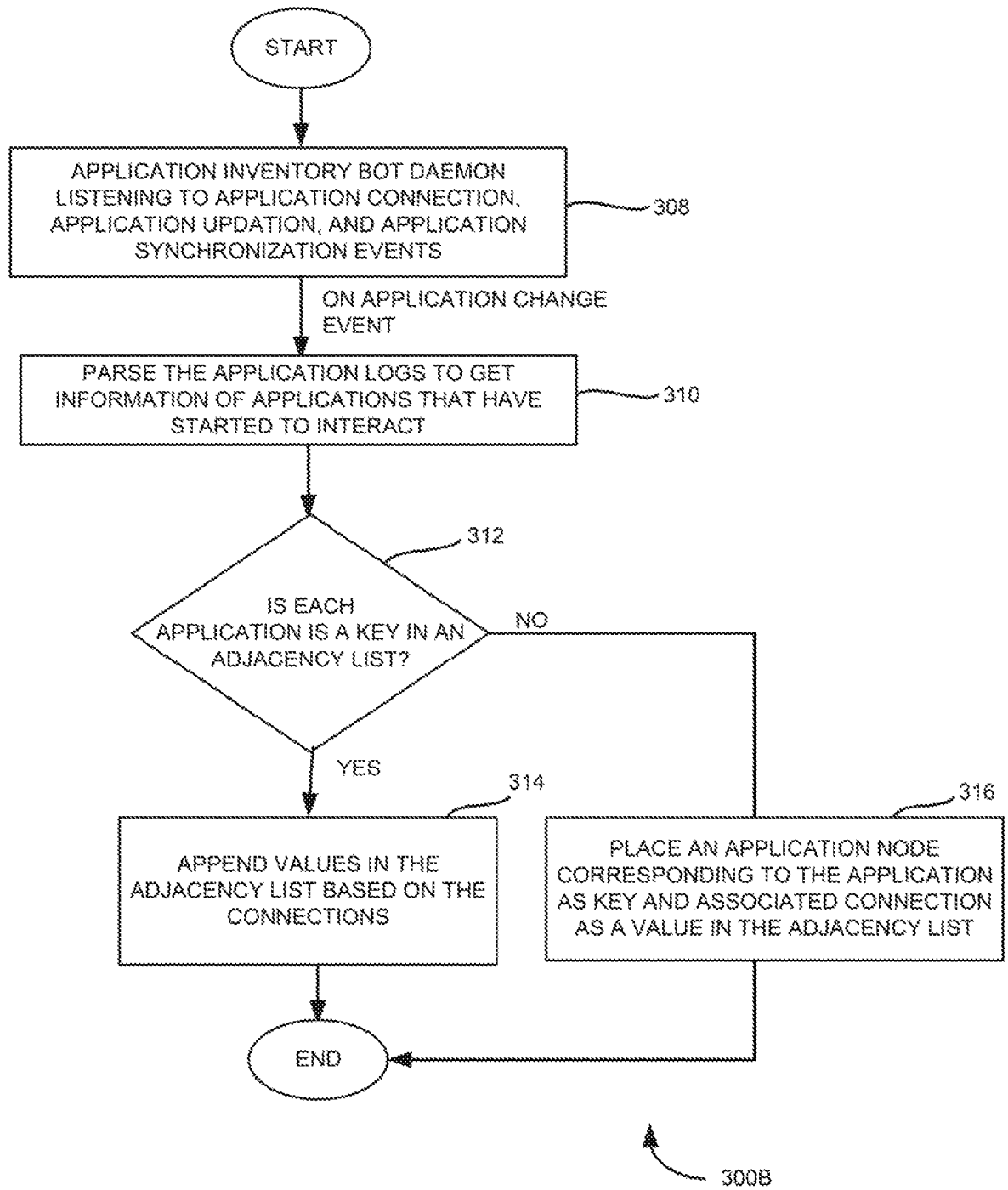
FIG. 3B is an example flow diagram illustrating determining communication information of an application through application logs during a connection phase of the application.

Referring now to FIG. 3B, which is an example flow diagram 300B illustrating determining communication information of an application through application logs during a connection phase of the application. During the connection phase of the application, connection/communication between application nodes corresponding to applications may be analyzed based on the application logs using an application inventory bot as follows. At 308, the application inventory bot (e.g., application inventory bot 220 of FIG. 2) may listen to application connection, application updation, and application synchronization events. Upon detecting an application change event, the application logs are parsed to get information (e.g., communication information) of the applications that have started to interact, at 310. At 312, a check is made to determine whether each of the applications interacting with other applications is a key in an adjacency list. When the application is the key in the adjacency list, values corresponding to the key in the adjacency list are appended based on the connection/communication information, at 314. When the application is not the key in the adjacency list, an application node corresponding to the application is placed as the key and associated connection is placed as a value in the adjacency list, at 316. Further, a visualization (e.g., application dependency graph 212 of FIG. 2) may be generated based on the adjacency list. For example, when application dependency graph 212 is depicted using a graph data structure, the keys and the values may be represented as connected objects, where the objects are connected by links or edges.

The links or edges or arrows between the nodes (e.g., the root nodes and child nodes) may indicate a message exchange or communication between the applications. For example, a link or an edge may indicate a direct message exchange between two applications and an arrow may indicate the direction of a connection between two applications. Application dependency graph is described with an example in FIG. 4.

For example, when a xenon application starts, the xenon application tries to connect to the other xenon applications to check their availability and further synchronizes with them. The connection information between xenon application can be logged in xenon application log and the logged information can be used to draw the dependency between application nodes corresponding to xenon applications.

In other examples, application inventory bot 220 may also look for the application logs to parse information such as broken communication between the applications and/or the application is down. For example, when an application node corresponding to a cluster application is down, there may be application log messages in other application nodes such as "could not connect to the node." In such a case, application management unit 210 may delete the connection (e.g., the edge between the application nodes) between two active application nodes based on the information parsed by application inventory bot 220. Also, when there is an application node with no incoming response (e.g., no incoming relation edge), the application node may be marked as inactive by application management unit 210 using application inventory bot 220.

An example algorithm for application inventory bot 220 to create dependencies between the application nodes is shown below:

```
Parse for communication requests for application nodes;
For all communication requests from source S to destination D do
{
    CREATE-EDGES (S, D);
}
```

An example algorithm for application inventory bot 220 to delete dependencies between the application nodes and to mark the application node as inactive are shown below:

```
Parse for broken connections or unavailable application nodes;
For all connection disruption from source S to destination D do
{
    DELETE-EDGES (S, D);
}
For all application node N in application dependency graph do
{
    If NODE-IN-DEGREE(N) is 0 then
    {
```

```
        MARK-NODE-INACTIVE(S);
    }
}
```

Further, log analyzer 208 may utilize garbage collection bot 222 to assist in collecting application nodes which are marked as "inactive." Garbage collection bot 222 may run periodically and help in collecting the application nodes which are marked as inactive.

Figure 3C:
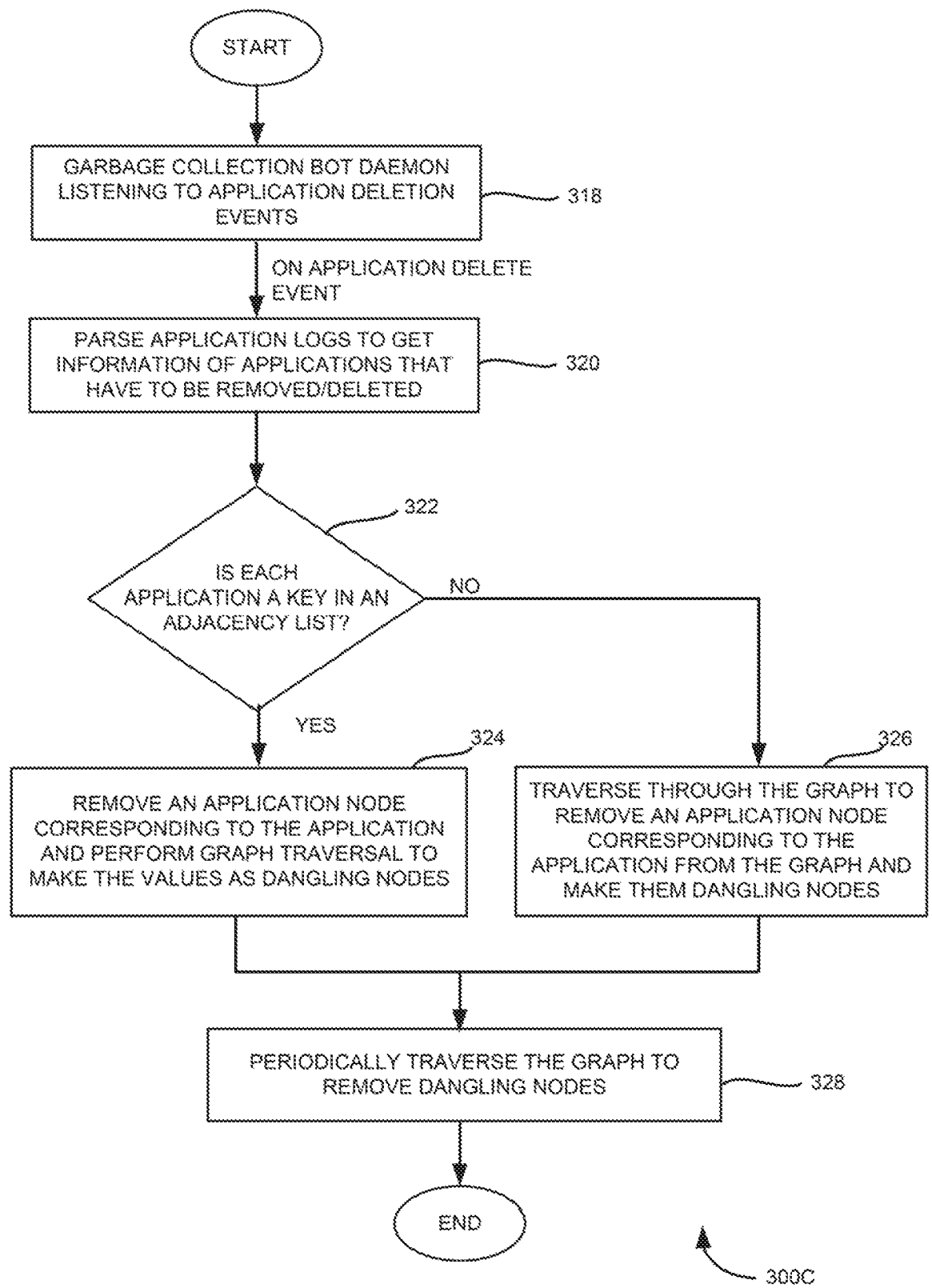
FIG. 3C is an example flow diagram illustrating deleting an application node marked as inactive during a garbage collection phase.

An example flow chart for garbage collection bot 220 is explained in FIG. 3C. FIG. 3C is an example flow diagram 300C illustrating deleting an application node marked as inactive during a garbage collection phase. New application nodes added by initialization bot 218 may be differentiated from the inactive application nodes with the help of a flag which may be a part of every application node.

At 318, garbage collection bot daemon (i.e., garbage collection bot 222 of FIG. 2) may listen to application deletion events for garbage collection. At 320, upon detecting an application deletion event, application logs may be parsed to get information of applications that have to be removed/deleted. At 322, a check is made to determine whether the application is a key in an adjacency list. If so, at 324, the key (i.e., the parent or root application node) may be removed, and a traversal of graph may be performed to make the values (i.e., child application nodes) as dangling nodes. If not, at 326, the graph may be traversed to remove the application node entries from the adjacency list and make them as dangling nodes. At 328, the graph may be periodically traversed to remove the dangling nodes having dirty bit set.

Examples described herein may be implemented in client-server systems. For example, management node may be a vRealize™ Operations Manager (vROPS), Log vRealize Automation®, vRealize Business, and/or Hyperic® that are offered by VMware. Examples described herein can be implemented in software as a service (SAAS), where the server communicating with multiple compute nodes (i.e., clients/agents/probes/slaves) could receive log files generated by the applications running on the multiple compute nodes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 4:
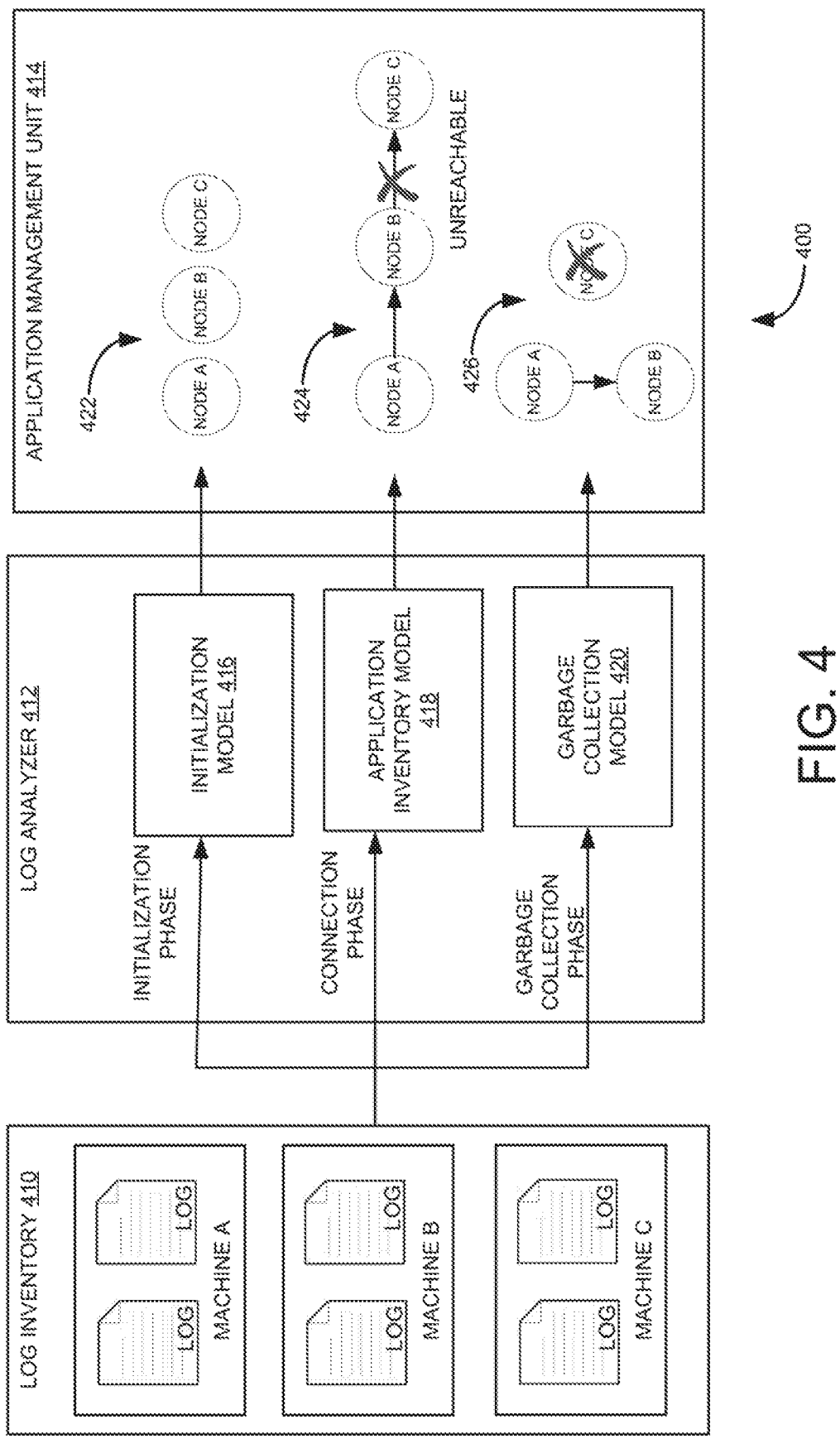
FIG. 4 is a block diagram of an example system, depicting an example application dependency map.

FIG. 4 is a block diagram of an example system 400, depicting an example application dependency map. The terms "application dependency map" and "application dependency graph" are used interchangeably throughout the document. System 400 may include a log inventory 410, a log analyzer 412, and an application management unit 414. The terms "log inventory" and "log inventory service" are used interchangeably throughout the document. As shown in FIG. 4, application logs including the relevant communication information corresponding to different compute nodes (e.g., machine A-C) may be collected and indexed in log inventory 410.

Log analyzer 412 may loop through the application logs from log inventory 410 and parse relevant information about the applications. In one example, log analyzer 412 may use a trained initialization model 416, a trained application inventory model 418, and a trained garbage collection model 420 to look for information such as application connection, application synchronization, monitoring topological or communication changes between the applications. Initialization model 416, application inventory model 418, and garbage collection model 420 can scan the real-time application logs to detect the presence, communication/connection and/or absence of the applications respectively at periodic intervals of time. The parsed information may, then, be sent to application management unit 414 to generate an adjacency list. Further, based on the adjacency list, application management unit 414 may generate a visualization (e.g., application dependency maps 422, 424, and 426).

During initialization phase, log analyzer 412 may utilize initialization model 416 to parse information of the applications through associated application logs. Further, application management unit 414 may determine presence of one or more applications based on the parsed information. The determined one or more applications are then included in the adjacency list, which is then used to generate the application dependency map. In the example, three applications (e.g., application A to C) are determined. Therefore, application nodes (i.e., node A, node B, and node C) corresponding to the determined applications are depicted in application dependency map 422.

During connection phase, log analyzer 412 may utilize application inventory model 418 to parse connections/communication information between the applications through associated application logs. Further, application management unit 414 may determine dependencies between the applications based on the parsed connections/communication information. The determined dependency information is then included in the adjacency list, which is then used to generate the application dependency map. In the example, a communication between application A and application B, and a communication between application B and application C are determined. In application dependency map 424, the communication information is depicted. For example, the connection between application A and application B is depicted by an edge between the application node A and the application node B.

Further, application inventory model 418 may analyze the application logs to parse information such as broken application communication and/or when the application is down. For example, when the communication between the application B and the application C is broken, the edge between the application node B and the application node C is removed by application management unit 414 using the information parsed by application inventory model 418. Further, application dependency map 424 is updated upon deleting the edge between the application node B and the application node C. As shown in application dependency map 424, the edge is deleted between the application node B and the application node C. In addition, when there is an application with no incoming response, an application node corresponding to the application may be marked as inactive by application inventory model 418 in the adjacency list.

During garbage collection phase, log analyzer 412 may utilize garbage collection model 420 to assist in collecting application nodes which are marked as "inactive." Further, application management unit 414 may delete the application nodes collected by garbage collection model 420. In application dependency map 426, the application node C is deleted based on the information provided by the garbage collection model 420. Example application dependency maps (e.g., 422, 424 and 426) may assist in getting insights into various applications and their interactions in form of an application dependency graph, which can be used to derive meaningful information on the topology.

Example Processes

Figure 5:
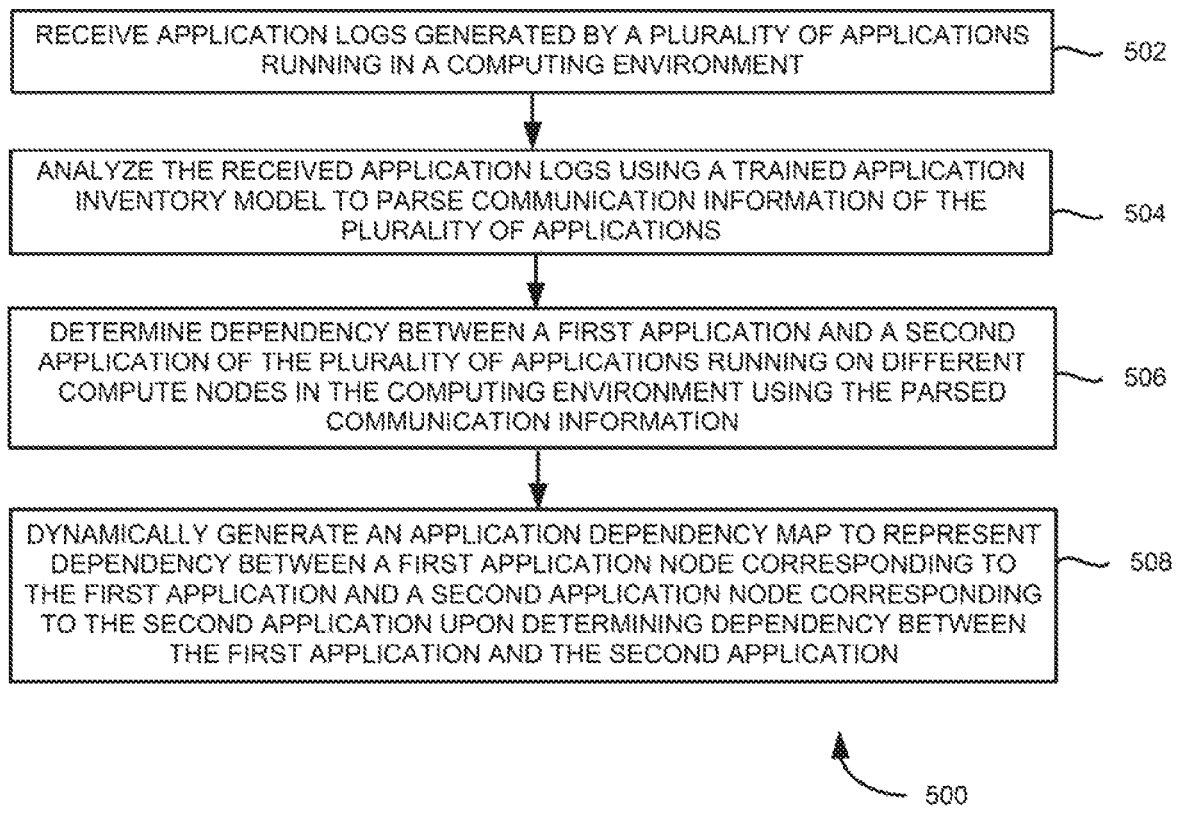
FIG. 5 is an example flow diagram illustrating determining dependencies between applications running on different compute nodes in a computing environment using application logs.

FIG. 5 is an example flow diagram 500 illustrating determining dependencies between applications running on different compute nodes in a computing environment using application logs. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 502, application logs generated by a plurality of applications running in a computing environment may be received by a log analyzer. In one example, the application logs generated by the plurality of applications may be indexed in a log inventory service. Further, the application logs are received by the log analyzer from the log inventory service. The plurality of applications may run on compute nodes in a single cloud or distributed across multiple clouds. Example compute node may include a virtual machine, a container, or a physical machine (e.g., physical server).

At 504, the received application logs may be analyzed by the log analyzer using a trained application inventory model to parse communication information of the plurality of applications. In one example, the application inventory model may be trained on input words and/or strings of words using machine learning and natural language processing methods. For example, the input words and/or the strings of words may be selected from historical application logs.

At 506, dependency between a first application and a second application of the plurality of applications running on different compute nodes in the computing environment may be determined using the parsed communication information. In some examples, dependency among application components associated with the first application and the second application can be determined upon determining the dependency between the first application and the second application based on analyzing the received application logs using the trained application inventory model.

At 508, an application dependency map may be generated to represent dependency between a first application node corresponding to the first application and a second application node corresponding to the second application upon determining dependency between the first application and the second application. In one example, with the generated application dependency map, how the applications in a network interact may be understood. Thereby, possible effects of changes in one application towards other dependent applications can be anticipated.

Figure 6:
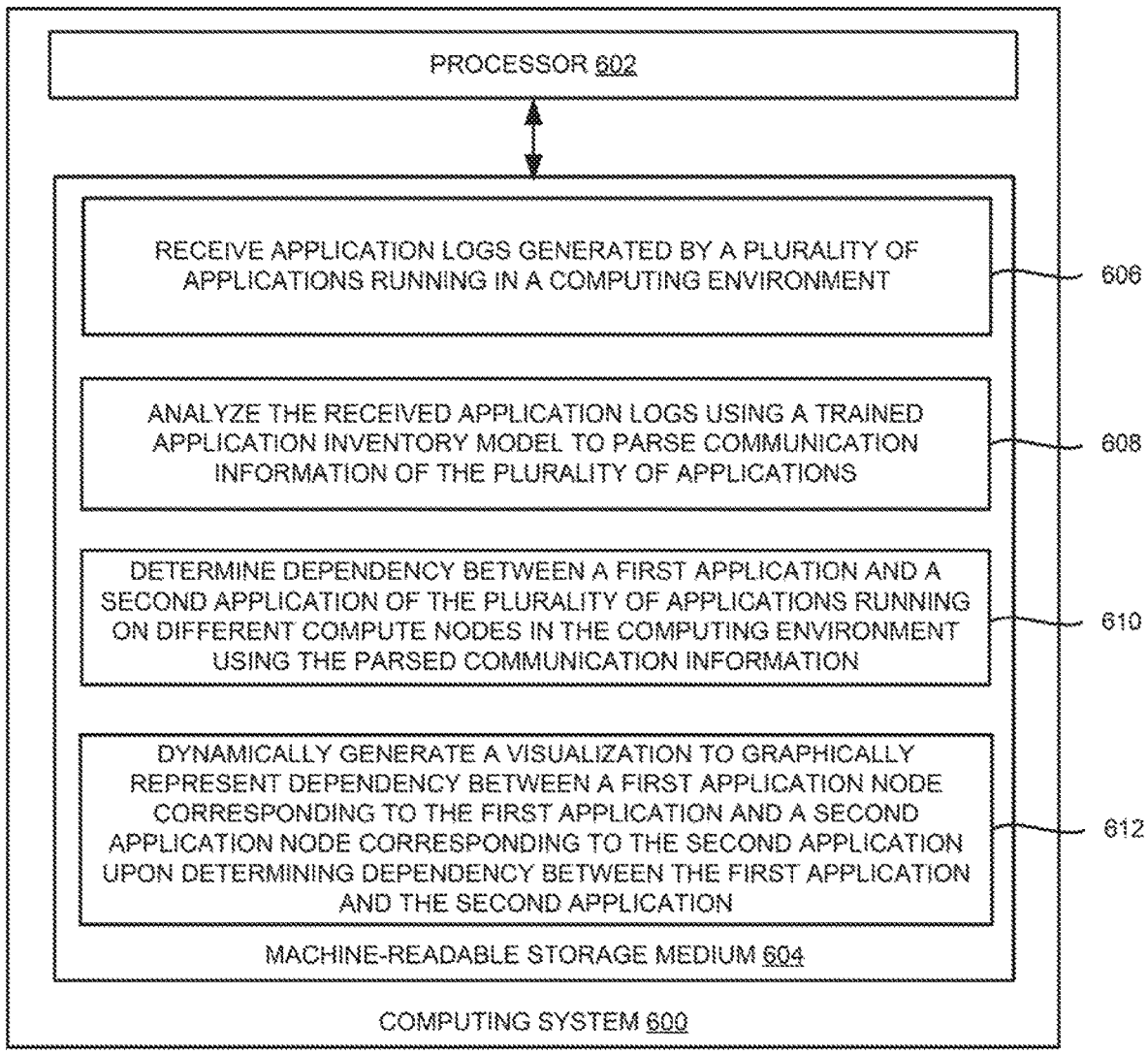
FIG. 6 is a block diagram of an example computing system including non-transitory computer-readable storage medium, storing instructions to determine dependencies between applications through application logs.

FIG. 6 is a block diagram of an example computing system 600 (e.g., management nodes 104 and 202 of FIGS. 1 and 2, respectively) including non-transitory computer-readable storage medium, storing instructions to discover applications through application logs. The computing system 600 may include a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random-access memory (RAM) or another type of dynamic storage device that may store information and machine-readable instructions that may be executed by the processor 602. For example, the machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to computing system 600.

The machine-readable storage medium 604 may store instructions 606-612. In an example, instructions 606-612 may be executed by processor 602 for determining dependencies between applications through application logs and the same may be graphically represented. Instructions 606 may be executed by processor 602 to retrieve application logs generated by a plurality of applications running in a computing environment. Instructions 608 may be executed by processor 602 to analyze the received application logs using a trained application inventory model to parse communication information of the plurality of applications. Instructions 610 may be executed by processor 602 to determine dependency between a first application and a second application of the plurality of applications running on different compute nodes in the computing environment using the parsed communication information. Further, instructions 612 may be executed by processor 602 to dynamically generate a visualization to graphically represent dependency between a first application node corresponding to the first application and a second application node corresponding to the second application upon determining dependency between the first application and the second application.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/ cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A system comprising:
 a processor; and
 memory coupled to the processor, wherein the memory comprises:
  a log analyzer to:
   receive application logs generated by a plurality of applications running in a computing environment; and
   parse the received application logs using a trained application inventory model to detect communication information of the plurality of applications, wherein the communication information comprise connections between the applications that are interacting with each other, and wherein the application inventory model is periodically scan the application logs for an application connection event, an application disconnection event, and/or an application connection change event between the applications; and
  an application management unit to:
   determine dependency between a first application and a second application of the plurality of applications running on different compute nodes in the computing environment using the detected communication information.

2. The system of claim 1, wherein the application management unit is to:
 dynamically generate a visualization to graphically represent dependency between a first application node corresponding to the first application and a second application node corresponding to the second application upon determining dependency between the first application and the second application, wherein the dependency is represented by an edge between the first application node and the second application node.

3. The system of claim 2, wherein the application management unit is to:
 determine disconnection between the first application and the second application based on parsing the received application logs using the trained application inventory model;
 delete the edge between the first application node and the second application node upon determining the disconnection; and
 update the visualization upon deleting the edge.

4. The system of claim 2, wherein the application management unit is to:
 determine an inactive application in the plurality of applications by parsing the received application logs using the trained application inventory model;
 delete an application node corresponding to the inactive application using a trained garbage collection model; and
 update the visualization upon deleting the application node.

5. The system of claim 4, wherein the application inventory model and the garbage collection model are trained on input words and/or strings of words using the machine learning and natural language processing methods, and wherein the input words and/or the strings of words are selected from historical application logs.

6. The system of claim 1, wherein the log analyzer is to:
 parse the received application logs using a trained initialization model to detect information about the plurality of applications, wherein the application, management unit is to determine a presence of the first application and the second application in the plurality of applications using the detected information.

7. The system of claim 6, wherein the initialization model is trained on input words and/or strings of words using the machine learning and natural language processing methods, and wherein the input words and/or the strings of words are selected from historical application logs.

8. The system of claim 1, further comprising:
 a log inventory service to index the application logs generated by the plurality of applications, wherein the log analyzer is to receive the indexed application logs from the log inventory service.

9. The system of claim 1, wherein each of the compute nodes comprises one of a virtual machine, a container, or a physical machine, and wherein the plurality of applications run in a single cloud or distributed across multiple clouds.

10. A method comprising:
 receiving, by a log analyzer, application logs venerated by a plurality of applications running in a computing environment;
 parsing, by the log analyzer, the received application logs using a trained application inventory model to detect communication information of the plurality of applications, wherein the communication information comprise connections between the applications that are interacting with each other, and wherein the application inventory model is trained using machine learning and natural language processing, methods to periodically scan the application logs for an application connection event, an application disconnection event, and/or an application connection change event between the applications; and
 determining, by an application management unit, dependency between a first application and a second application of the plurality of applications running on different compute nodes in the computing environment using the detected communication information.

11. The method of claim 10, further comprising:
generating, by the application management unit, an application dependency map to represent dependency between a first application node corresponding to the first application and a second application node corresponding to the second application upon determining dependency between the first application and the second application, wherein the dependency is represented by an edge between the first application node and the second application node.

12. The method of claim 11, further comprising:
determining, by the application management unit, disconnection between the first application and the second, application based on parsing the received application logs using the trained application inventory model;
deleting, by the application management unit, the edge between the first application node and the second application node upon determining the disconnection; and
updating, by the application management unit, the application dependency map upon deleting the edge.

13. The method of claim 11, further comprising:
determining, by the application management unit, an inactive application in the plurality of applications by parsing the received application logs using the trained application inventory model; and
deleting, by the application management unit, an application node corresponding to the inactive application using a trained garbage collection model; and
updating, by the application management unit, the application dependency map upon deleting the application node.

14. The method of claim 10, comprising:
parsing, by the log analyzer, the received application logs using a trained initialization model to detect information about the plurality of applications; and
determining, by the application management unit, a presence of the first application and the second application in the plurality of applications using the detected information prior to determining the dependency between the first application and the second application.

15. The method of claim 10, further comprising:
indexing the application logs generated by the plurality of applications in a log inventory service, wherein the application logs are received by the log analyzer from the log inventory service.

16. The method of claim 10, wherein each of the compute nodes comprises one of a virtual machine, a container, or a physical machine, and wherein the plurality of applications run in a single cloud or distributed across multiple clouds.

17. The method of claim 10, further comprising:
determining, by the application management unit, dependency among application components associated with the first application and the second application upon determining the dependency between the first application and the second application based on parsing the received application logs using the trained application inventory model.

18. A non-transitory machine-readable storage medium encoded with instructions that, when executed by a processor, cause the processor to:
retrieve application logs generated by a plurality of applications running in a computing environment;
parse the received application logs using a trained application inventory model to detect communication information of the plurality of applications, wherein the communication information comprise connections between the applications that are interacting with each other, and wherein the application inventory model is trained using machine learning and natural language processing methods to periodically scan the application logs for an application connection event, an application disconnection event, and/or an application connection change event between the applications; and
determine dependency between a first application and a second application of the plurality of applications running on different compute nodes in the computing environment using the detected communication information.

19. The non-transitory machine-readable storage medium of claim 18, further comprising instructions to:
generate a visualization to graphically represent dependency between a first application node corresponding to the first application and a second application node corresponding to the second application upon determining dependency between the first application and the second application, wherein the dependency is represented by, an edge between the first application node and the second application node.

20. The non-transitory machine-readable storage medium of claim 19, further comprising instructions to:
determine disconnection between the first application and the second application based on parsing the received application logs using the trained application inventory model; and
delete the edge between the first application node and the second application node upon determining the disconnection; and
update the visualization upon deleting the edge.

21. The non-transitory machine-readable storage medium of claim 19, further comprising instructions to:
determine an inactive application in the plurality of applications by parsing the received application logs using the trained application inventory model; and
delete an application node corresponding to the inactive application using a trained garbage collection model; and
update the visualization upon deleting the application node.

22. The non-transitory machine-readable storage medium of claim 18, comprising instructions to:
parse the received application logs using a trained initialization model to detect information about the plurality of applications; and
determine a presence of the first application and the second application in the plurality of applications using the detected information.

23. The non-transitory machine-readable storage medium of claim 18, wherein each of the compute nodes comprises one of a virtual machine, a container, or a physical machine, and wherein the plurality of applications run in a single cloud or distributed across multiple clouds.

* * * * *